(12) United States Patent
Kashimura

(10) Patent No.: US 7,698,964 B2
(45) Date of Patent: Apr. 20, 2010

(54) GEAR

(75) Inventor: Noritake Kashimura, Kawaguch (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/824,629

(22) Filed: Jul. 2, 2007

(65) Prior Publication Data

US 2008/0022799 A1 Jan. 31, 2008

(30) Foreign Application Priority Data

Jul. 31, 2006 (JP) ............... 2006-208227

(51) Int. Cl.
*F16H 55/14* (2006.01)

(52) U.S. Cl. .............. 74/461; 74/443; 74/460; 74/462

(58) Field of Classification Search ........ 74/411, 74/457, 460, 461, 462, 443, DIG. 10
See application file for complete search history.

(56) References Cited

U.S. PATENT DOCUMENTS

| | | | | |
|---|---|---|---|---|
| 820,789 | A * | 5/1906 | Hutchins | 74/460 |
| 2,737,033 | A * | 3/1956 | Bendall | 464/73 |
| 3,304,795 | A * | 2/1967 | Rouverol | 74/411 |
| 3,999,445 | A * | 12/1976 | Liautaud | 74/445 |
| 4,047,395 | A * | 9/1977 | Bendall | 464/51 |
| 4,184,380 | A * | 1/1980 | Rivin | 74/461 |
| 4,458,547 | A * | 7/1984 | Fina | 74/460 |
| 4,589,860 | A * | 5/1986 | Brandenstein et al. | 474/161 |
| 5,098,346 | A * | 3/1992 | Redmond | 474/161 |
| 5,358,460 | A * | 10/1994 | Vranish | 475/344 |
| 6,077,063 | A * | 6/2000 | Santi | 425/116 |
| 7,048,972 | B2 * | 5/2006 | Kitahata et al. | 427/466 |
| 7,556,864 | B2 * | 7/2009 | Yamanishi et al. | 428/602 |
| 2004/0253912 | A1 * | 12/2004 | Menjak et al. | 451/47 |
| 2005/0160852 | A1 * | 7/2005 | Takeuchi et al. | 74/414 |
| 2007/0012134 | A1 * | 1/2007 | Daout | 74/440 |
| 2007/0180943 | A1 * | 8/2007 | Daout | 74/457 |

FOREIGN PATENT DOCUMENTS

| | | |
|---|---|---|
| JP | 2003-090412 | 3/2003 |
| JP | 2004346981 | * 12/2004 |

* cited by examiner

*Primary Examiner*—Richard W L Ridley
*Assistant Examiner*—Matthew A Johnson
(74) *Attorney, Agent, or Firm*—William L. Androlia; H. Henry Koda

(57) ABSTRACT

A gear having a thin-walled section formed on one end face among two end faces of a tooth in a tooth-width direction is provided. A portion of the thin-walled section is projected and formed so as to serve as an overhanging section. The overhanging section prevents backlash. A thickness T3 of the overhanging section, a thickness T2 of a tooth flank corresponding section, and a thickness T1 of a tooth crest corresponding section positioned therebetween satisfies the relation $T1<T3<T2$.

4 Claims, 3 Drawing Sheets

GEAR

BACKGROUND OF THE INVENTION

1. Field of the Invention

The present invention relates to a gear structured to reduce backlash.

2. Description of the Related Art

Compared to a metal gear, a plastic gear has operational advantages such as being light in weight, being self-lubricating, thereby allowing use without a lubricant, and having low noise. At the same time, the plastic gear has manufacturing advantages such as allowing high productivity and allowing mass-production, thereby allowing a reduction in manufacturing costs. In recent years, the plastic gear having such advantages has been widely used in, for example, gear trains in ink-jet printers, power transmission sections of automobiles, and gear trains in precision machinery. The range of use of the plastic gear is expanding.

Even in the plastic gear having low noise, as described above, teeth-knocking noises (undesirable noises) frequently occur depending on usage methods, causing undesirable noises. For example, when the plastic gear is used in an intermittent rotation transmission mechanism, two gears that are intermeshed transmit power while frequently repeating rotation-start and rotation-stop. Therefore, at rotation-start, a tooth of a gear on a driving side immediately after the rotation-start collides with a tooth of a gear on a driven side that is not moving. As a result, the teeth-knocking noise occurs. At the same time, at rotation-stop, the tooth of the gear on the driven side collides with the tooth of the gear on the driving side that has stopped before the gear on the driven side, as a result of inertia. As a result, the teeth-knocking noise occurs. In the intermittent rotation transmission mechanism, rotation-start and rotation-stop are frequently repeated. Therefore, the teeth-knocking noises frequently occur and become undesirable noise.

To prevent such teeth-knocking noises during power transmission, innovative plastic gears have been proposed.

For example, a plastic gear disclosed in Patent Literature 1 includes an almost triangular cavity section on both end faces of a tooth in a tooth-width direction. The cavity section reduces the thickness of the tooth. An angular thin-walled section is formed surrounding the cavity section. The gear is structured so that, as a result of differential shrinkage after injection-molding, the tooth thickness of the thin-walled section is thicker than the tooth thickness of an area without a thin-walled section. In other words, the thin-walled section is formed so as to project from a tooth flank in the area without the thin-walled section. In the gear, the thin-walled section is flexibly deformed during an initial stage of meshing with a partner gear and absorbs impact. Therefore, the gear can prevent the teeth-knocking noises from occurring.

Patent Literature 1: Japanese Patent Laid-open Publication No. 2003-90412

SUMMARY OF THE INVENTION

However, in the conventional example described above, the entire thin-walled section is formed having almost the same thickness. Therefore, even when an attempt is made to deform the thin-walled section corresponding to one tooth flank towards the thin-walled section corresponding to another tooth flank when the gear meshes with the partner gear, a force preventing the deformation is generated near the top of the thin-walled section (near an area corresponding with the tooth crest). Therefore, the deformation of the thin-walled section is not necessarily performed smoothly, and torque fluctuations are likely to occur. Because stress is concentrated near the top, cracks are likely to form as a result of use over a long time. Furthermore, overshooting occurs, and positioning accuracy decreases.

Therefore, an object of the present invention is to provide a gear in which a thin-walled section provided to eliminate backlash is deformed smoothly, thereby controlling torque fluctuations, preventing the formation of cracks and the like, and furthermore, preventing the decrease in positioning accuracy caused by overshoot.

The invention according to claim 1 is related to a gear. The gear of the invention includes a thin-walled section formed on at least an end face on one side, among end faces on both sides of a tooth in a tooth-width direction. The thin-walled section is formed from the end face toward the tooth-width direction. The thin-walled section includes an overhanging section and a tooth crest corresponding section. The overhanging section is modeled after one tooth flank, among two tooth flanks of the tooth. The overhanging section is formed sloped from the one tooth flank toward an adjacent tooth on the one tooth flank side. The tooth crest corresponding section is modeled after a tooth crest of the tooth and is consecutive with the overhanging section. The thickness of the tooth crest corresponding section is formed thinner than the thickness of the overhanging section to facilitate deformation in accompaniment to the deformation of the overhanging section when the gear meshes with the partner gear.

The invention according to claim 2 is the gear according to claim 1, in which the thin-walled section has a tooth flank corresponding section modeled after another tooth flank among the two tooth flanks. The tooth flank corresponding section is formed from the end face toward the tooth-width direction and is consecutive with the tooth crest corresponding section. The thickness of the tooth flank corresponding section is formed thicker than the overhanging section to make deformation more difficult compared to the overhanging section.

The invention according to claim 3 is the gear according to claim 1 or 2, in which the thin-walled section includes a bottom land corresponding section. The bottom land section is modeled after a bottom land and formed from the end face toward the tooth-width direction to consecutively connect the overhanging section and the tooth flank corresponding section of the adjacent tooth. The thickness of a connecting section between the overhanging section and the bottom land corresponding section is formed thinner than other areas of the overhanging section and the bottom land corresponding section so that the overhanging section is easily deformed toward the tooth flank corresponding section when the gear meshes with the partner gear.

The invention according to claim 4 is the gear according to any one of claims 1 to 3, in which the overhanging section has an intermediate section within a tip of the overhanging section in the tooth-width direction. The intermediate section is disposed between the tooth crest corresponding section and the bottom land corresponding section and intersects with the pitch circle. The projection amount is greatest in the intermediate section.

EFFECT OF THE INVENTION

In the invention according to claim 1, when the gear meshes with the partner gear, a gap equivalent to backlash is formed between the two gears. However, because the overhanging section within the thin-walled section can fill the gap, the backlash can be eliminated. The tooth crest corresponding section is formed thinner than the thickness of the overhanging section. Therefore, when the gear is meshed with the partner gear, the tooth crest corresponding section can be easily deformed in accompaniment to the deformation of the overhanging section. Therefore, the torque fluctuations can be controlled. The formation of cracks and the like attributed to stress concentration can be prevented, and the decrease in positioning accuracy due to overshoot can be prevented.

In the invention according to claim 2, the overhanging section, the tooth crest corresponding section, and the tooth flank corresponding section are sequentially and consecutively formed. Regarding thickness, the tooth crest corresponding section positioned between the overhanging section and the tooth flank section is the thinnest, followed by the overhanging section. The tooth flank corresponding section is the thickest. This order is also the order in which deformation is easily performed. In other words, when the overhanging section becomes deformed during meshing, the tooth flank corresponding section becomes a reactive force with little deformation. The most easily deformed tooth crest corresponding section becomes deformed between the overhanging section and the tooth flank corresponding section.

In the invention according to claim 3, the connecting section between the overhanging section and the bottom land corresponding section is easily deformed. Therefore, the deformation of the overhanging section is further facilitated. In other words, the overhanging section is sandwiched between the tooth crest corresponding section and the connecting section that are both easily deformed. As a result, deformation is further facilitated.

In the invention according to claim 4, the intermediate section at the tip of the overhanging section is formed having almost the same shape as a portion of the tooth flank. The projection amount in the intermediate section is set to be the greatest. Therefore, when the overhanging section is deformed, the intermediate section becomes flush with the tooth flank and does not interfere with smooth meshing between gears.

DETAILED DESCRIPTION OF THE PREFERRED EMBODIMENT

Embodiments of the present invention will be described in detail, with reference to the drawings.

First Embodiment

Figure 1:
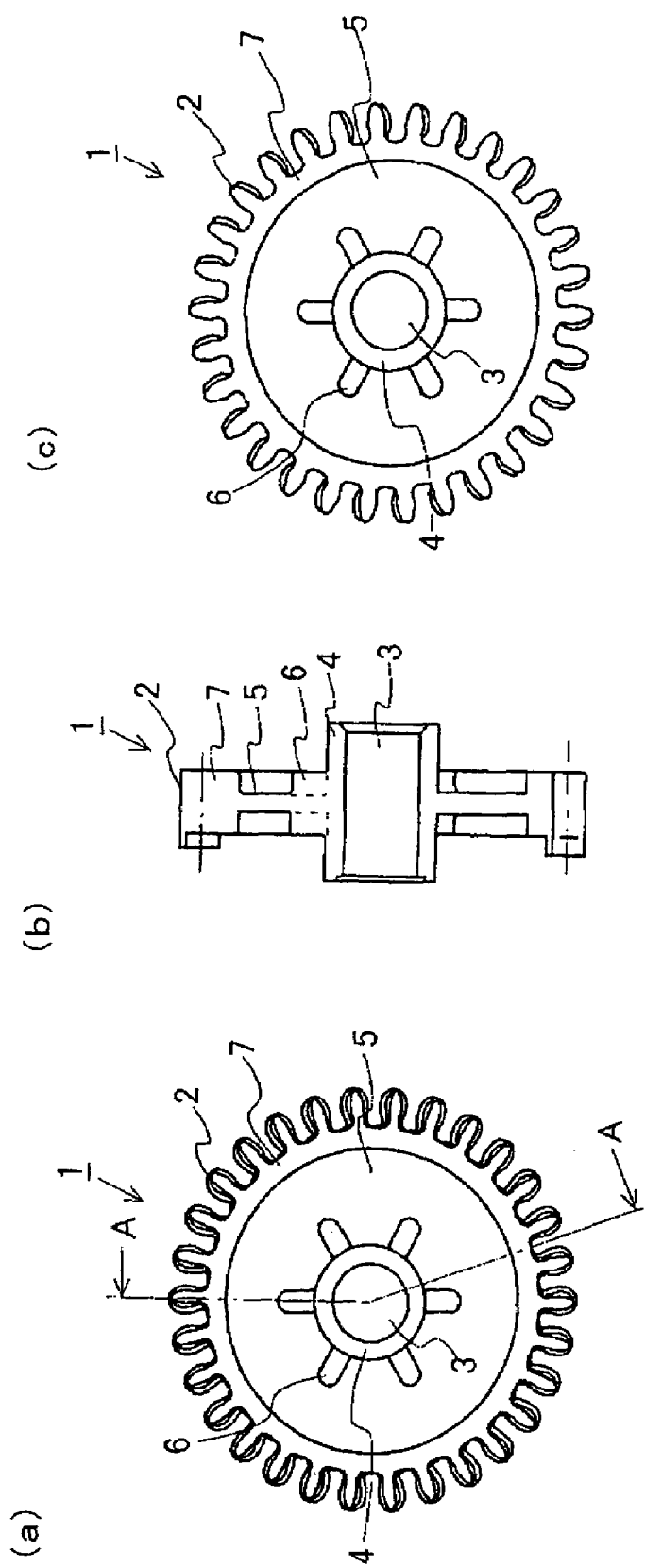
FIG. 1A is a front view of a plastic gear.
FIG. 1B is cross-sectional diagram taken along line A-A in FIG. 1A.
FIG. 1C is a rear view of the plastic gear.
Figure 2:
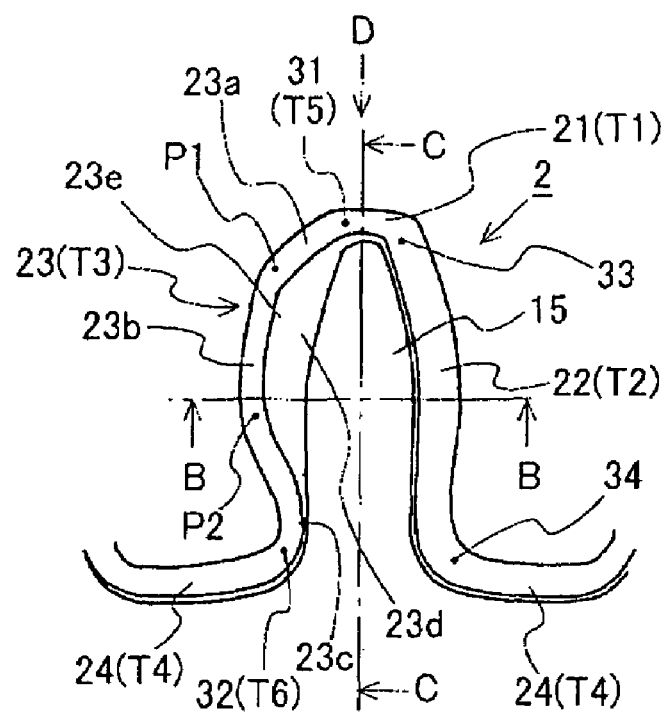
FIG. 2 is an enlarged explanatory diagram of a tooth of the plastic gear 1, viewed from the front side.
Figure 3:
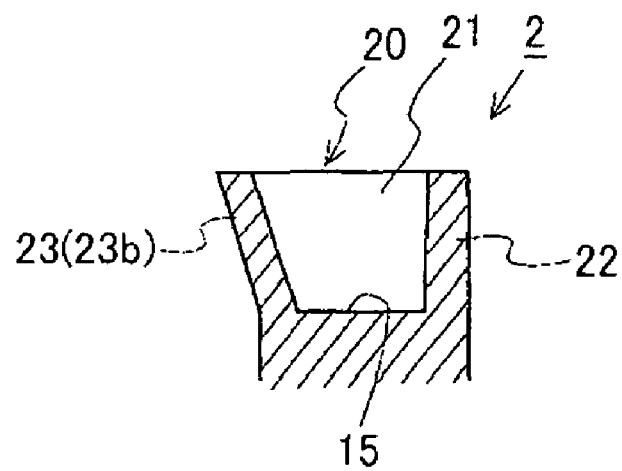
FIG. 3 is a cross-sectional diagram of the tooth taken along line B-B in FIG. 2.
Figure 4:
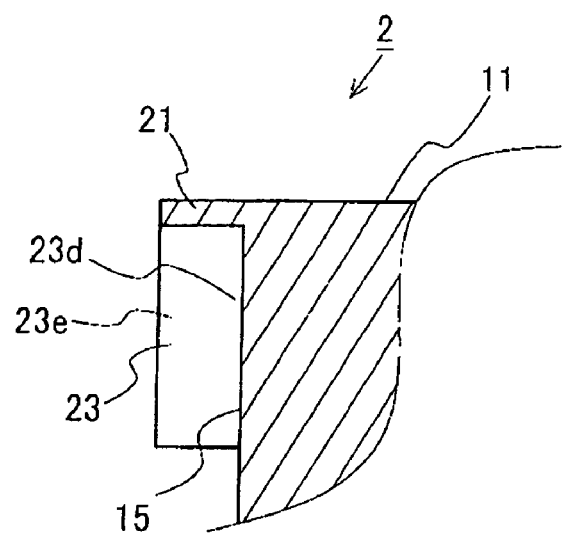
FIG. 4 is an enlarged cross-sectional diagram of the tooth taken along line C-C in FIG. 2.
Figure 5:
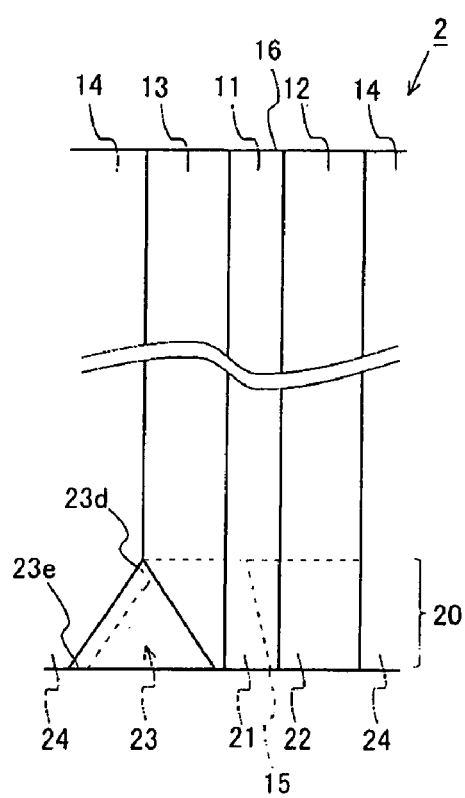
FIG. 5 is an enlarged planar view of the tooth viewed from the direction of an arrow D in FIG. 2.

FIG. 1 to FIG. 5 are diagrams of a gear (plastic gear) 1 according to an embodiment of the present invention. FIG. 1A is a front view of a plastic gear 1. FIG. 1B is cross-sectional diagram taken along line A-A in FIG. 1A. FIG. 1C is a rear view of the plastic gear 1. FIG. 2 is an enlarged explanatory diagram of a tooth 2 of the plastic gear 1, viewed from the front side. FIG. 3 is a cross-sectional diagram of the tooth 2 taken along line B-B in FIG. 2. FIG. 4 is an enlarged cross-sectional diagram of the tooth 2 taken along line C-C in FIG. 2. FIG. 5 is an enlarged planar view of teeth 2 viewed from the direction of an arrow D in FIG. 2.

The plastic gear 1 shown in FIG. 1 to FIG. 5 according to the embodiment is a spur gear formed by injection-molding using resin material, such as polyacetal, polyamide, polyphenylene sulfide, and polybutylene terephthalate.

As shown in FIGS. 1A to 1C, a boss section 4 is disposed in the center of the plastic gear 1 in the radial direction. The boss section 4 has an axis hole 3. A roughly discoid web 5 extends in an outward radial direction from almost the center of the outer peripheral surface of the boss section 4 in an axial direction. Radial direction ribs 6 are provided at respective positions dividing the web 5 into a plurality of equal sections (equally divided into six sections, according to the embodiment), on an inner peripheral side of the web 5. At the same time, a rim 7 is provided on an outer peripheral side of the web 5. On an outer peripheral surface of the rim 7, a plurality of teeth 2 are formed in the circumferential direction at a predetermined pitch.

As shown in FIG. 5, each tooth 2 includes a tooth crest 11, two tooth flanks 12 and 13, a bottom land 14, a front end face (one end face; the end face positioned in the lower area in FIG. 5) 15 along a tooth-width direction (vertical direction in FIG. 5), and a rear end face (another end face; the end face positioned in the upper area in FIG. 5) 16 also along the tooth-width direction. According to the embodiment, among the two tooth flanks 12 and 13, the tooth flank 12 is explained as a main power transmitting surface.

As shown in FIG. 2 and FIG. 5, a thin-walled section 20 is provided so as to project outwards in the tooth-width direction from the front end face 15, among the end faces 15 and 16. The thin-walled section 20 is consecutively formed, roughly modeled after the tooth crest 11, both tooth flanks 12 and 13, and the bottom land 14. In other words, the thin-walled section 20 includes a tooth crest corresponding section 21, a tooth flank corresponding section 22, a bottom land corresponding section 24, and an overhanging section 23. The tooth crest corresponding section 21 is modeled after the tooth crest 11. The tooth flank corresponding section 22 is modeled after the other tooth flank 12, among the two tooth flanks 12 and 13. The bottom land corresponding section 24 is modeled after the bottom land 14. The overhanging section 23 is formed corresponding to the one tooth flank 13, among the two tooth flanks 12 and 13. The overhanging section 23 is formed so as to project toward an adjacent tooth to eliminate backlash. The backlash occurs when the plastic gear 1 meshes with a partner gear (not shown). In other words, in the thin-walled section 20, the bottom land corresponding section 24, the overhanging section 23, the tooth crest corresponding section 21, and the tooth flank corresponding section 22 consecutively configure one unit. The bottom land corresponding section 24 is positioned on the left side in FIG. 2. The overhanging section 23 rises from the right end of the bottom land corresponding section 24. The tooth crest corresponding section 21 extends in the rightward direction from the upper end of the overhanging section 23. The tooth flank corresponding section 22 falls downward from the right end of the tooth crest corresponding section 21. The unit is repeated the same number of times as the number of teeth 2, along the outer periphery of the plastic gear 1. In the descriptions hereafter, as shown in FIG. 2, a connecting section between the overhanging section 23 and the tooth crest corresponding section 21 is described as a first connecting section 31. A connecting section between the overhanging section 23 and the bottom land corresponding section 24 is described as a second connecting section 32. A connecting section between the tooth flank corresponding section 22 and the tooth crest corresponding section 21 is described as a third connecting section 33. A connecting section between the tooth flank corresponding section 22 and the bottom land corresponding section 24 is described as a fourth connecting section 34.

As shown in FIG. 2 and FIG. 5, the tooth crest corresponding section 21, the tooth flank corresponding section 22, and the bottom land corresponding section 24 of the thin-walled section 20 are respectively configured so that thickness is provided by the tooth crest 11, the tooth flank 12, and the bottom land 14 being directly extended outward in the tooth-width direction. Therefore, the outer faces of the tooth crest corresponding section 21, the tooth flank corresponding section 22, and the bottom land corresponding section 24 are sequentially flush with the tooth crest 11, the tooth flank 12, and the bottom land 14. On the other hand, the overhanging section 23 differs from the above. In other words, as shown in FIG. 2, FIG. 4, and FIG. 5, the overhanging section 23 is formed so as to slope from a base end 23d to a tip end 23e. The base end 23d near the one end face 15 in the tooth-width direction is modeled after the one tooth flank 13. The tip end 23e far from the one end face 15 in the tooth-width direction is formed so as to project toward an adjacent tooth. Therefore, the projection amount of the overhanging section 23 at the base end 23d is zero. Here, as shown in FIG. 2, the tip 23e of the overhanging section 23 is divided into three areas with borders P1 and P2 as borders. The area close to the first connecting section 31 is a tooth crest side 23a. The area close to the second connecting section 32 is a tooth root side 23c. The area positioned between the tooth crest side 23a and the tooth root side 23c is an intermediate section 23b. The projection amount on the tooth crest side 23a decreases the closer it is to the first connecting section 31. The projection amount increases the farther it is from the first connecting section 31 and the closer it is to the boundary P1. The projection amount is the greatest at the intermediate section 23b. The maximum projection amount is maintained in the intermediate section 23b. In other words, the intermediate section 23b intersects with the pitch circle of the plastic gear 1. The shape of the intermediate section 23b is almost the same as a portion of the tooth flank 13. The projection amount on the tooth root side 23c increases the closer it is to the boundary P2. The projection amount decreases the farther it is from the boundary P2 and the closer it is to the second connecting section 32.

As described above, the projection amount of the overhanging section 23 at the tip 23e gradually increases from the first connecting section 31 to the second connecting section 32 on the tooth crest side 23a. The maximum projection amount is maintained in the intermediate section 23. The projection amount gradually decreases on the tooth root side 23c. Therefore, when the tooth 2 starts to mesh with the tooth of the partner gear, contact with the overhanging section 23 is smooth. A movement in which the tooth 2 is separated from the tooth of the partner gear when the meshing of the tooth 2 is released is smooth. As a result, smooth power transmission can be performed and operational noises can be reduced. In addition, the projection amount is set to a degree allowing at least the backlash set between the intermeshing partner gear and the plastic gear to be absorbed.

The plastic gear 1 configured as such can absorb backlash by being elastically deformed by the partner gear. Even when the partner gear rotates as a result of inertia when the plastic gear 1 stops rotating, the plastic gear 1 absorbs the rotational energy of the partner gear as a result of elastic deformation of the overhanging section 23. The impact occurring when the meshing tooth flanks mutually collide is softened, and the occurrence of the teeth-knocking noises can be suppressed.

According to the embodiment, as a result of the thickness of the thin-walled section 20 being set as described hereafter, the deformation of the overhanging section 23 is performed smoothly, the torque fluctuations are controlled, and the formation of cracks and the like attributed to stress concentration can be prevented.

Regarding the thickness of the thin-walled section 20, when the thickness of the tooth crest corresponding section 21 is T1, the thickness of the tooth flank corresponding section 22 is T2, the thickness of the overhanging section 23 is T3, the thickness of the bottom land corresponding section 24 is T4, the thickness of the first connecting section 31 that is the connecting section between the tooth flank corresponding section 22 and the overhanging section 23 is T5, and the thickness of the second connecting section 32 that is the connecting section between the overhanging section 23 and the bottom land 24 is T6, according to the embodiment, each thickness is set to first satisfy the following:

$$T1<T2, T3$$

In other words, the thickness T1 of the tooth crest corresponding section 21 is thinner than the thickness T2 of the tooth flank corresponding section 22 and the thickness T3 of the overhanging section 23. As a result, in accompaniment to the deformation of the overhanging section 23 toward the tooth flank corresponding section 22 when the plastic gear 1 meshes with the partner gear, the tooth crest corresponding section 21 becomes easily deformed between the tooth flank corresponding section 22 and the overhanging section 23. In other words, the tooth crest corresponding section 21 does not inhibit the deformation of the overhanging section 23. The torque fluctuations attributed to the overhanging section 23 being difficult to deform and the formation of cracks and the like attributed to stress concentration can be prevented.

Next, according to the embodiment, the following is satisfied:

$$T3<T2$$

In other words, the thickness T2 of the tooth flank corresponding section 22 is made thicker than the thickness T3 of the overhanging section 23. As a result, even when the overhanging section 23 is deformed during meshing, the tooth flank corresponding section 22 becomes a reactive force element with little deformation. Then, the most easily deformed tooth crest corresponding section 21 is deformed toward the bottom land of the partner gear, between the overhanging section 23 and the tooth flank corresponding section 22. The tooth flank corresponding section 22 is formed thicker than other areas, as described above. Therefore, when the plastic gear 1 is formed by injection-molding, for example, although the tooth crest corresponding section 21 is thin and difficult to fill with molten resin, the molten resin can be poured via the tooth flank corresponding section 22. Therefore, the tooth crest corresponding section 21 can be successfully filled with molten resin.

Furthermore, according to the embodiment, the following is satisfied:

$$T6<T3, T4$$

In other words, the thickness T6 of the second connecting section 32 is made thinner than the thickness T3 of the overhanging section 23 and the thickness T4 of the bottom land corresponding section 24. As a result, the deformation of the overhanging section 23 is further facilitated. In other words, the deformation of the overhanging section 23 is further facilitated because the overhanging section 23 is sandwiched between the tooth crest corresponding section 21 and the second connecting section 32 that are both easily deformed.

Furthermore, the following can be satisfied:

$$T5<T6$$

In this case, the deformation of the tooth crest corresponding section 21 accompanying the deformation of the overhanging section 23 is further facilitated.

A portion of the tooth crest corresponding section 21, such as an area positioned halfway between the first connecting section 31 and the third connecting section 33, can be made even thinner than the thickness T1 of other areas of the tooth crest corresponding section 21. In this case, the tooth crest corresponding section 21 is even more easily deformed at "the area that is even thinner".

The changes in the thickness of the thin-walled section 20 in the first connecting section 31, the second connecting section 32, the third connecting section 33, and the fourth connecting section 34, according to the above embodiment, occur gradually.

When the plastic gear 1 of the invention is formed from a material such as polyacetal (POM) by injection molding, for example, the following is preferably set between the thickness T1 of the tooth crest corresponding section 21, the thickness T3 of the overhanging section 23, and the thickness T2 of the tooth flank corresponding section 22:

$$T1:T3:T2=3:4:6$$

However, in this case, the thickness T1 of the tooth crest corresponding section 21 that is the thinnest and difficult to fill with the molten resin is set thicker than a minimum thickness at which the tooth crest corresponding section 21 can be filled without any problems.

As described above, the thickness T2 of the tooth flank corresponding section 22 is formed thicker than the thickness T1 of the tooth crest corresponding section 21. As a result, during injection-molding, a flow of molten resin can be provided from the tooth flank corresponding section 22 to the tooth crest corresponding section 21, in addition to the flow of molten resin provided from the tooth 2 to the tooth flank corresponding section 22 and the tooth crest corresponding section 21 in the tooth-width direction. Therefore, with regard to the tooth crest corresponding section 21 which is often insufficiently filled with the molten resin, a large amount of molten resin can be poured therein. As a result, the thickness T1 of the tooth crest corresponding section 21 can be made thin.

According to the above embodiment, an example in which the thin-walled section 20 is formed on one end face 15 of the tooth 2 in the tooth-width direction is explained. However, the invention is not limited thereto. The same thin-walled section 20 can be provided on the other end face 16 of the tooth 2 in the tooth-width direction. However, in this case, the overhanging section 23 is provided on the tooth flank 13 side on which the overhanging section 23 on the one end face 15 side is provided.

According to the above embodiment, an example in which the invention is applied to a spur gear is explained. However, the invention is not limited thereto. The invention can also be applied to a helical gear.

Second Embodiment

According to the first embodiment described above, an example in which the thin-walled section 20 includes the tooth crest corresponding section 21, the tooth flank corresponding section 22, the overhanging section 23, and the bottom land corresponding section 24 that are formed consecutively is explained. The invention is not limited thereto. For example, a configuration is included in which the thin-walled section 20 does not include the tooth flank corresponding section 22 and the bottom land corresponding section 24 and is configured by the tooth crest corresponding section 21 and the overhanging section 23 that are alternating and consecutive. However, in this case as well, the thickness T1 of the tooth crest corresponding section 21 and the thickness T3 of the overhanging section 23 are set so as to fulfill the following between T1 and T3:

$$T1>T3$$

According to the present embodiment, the tooth crest corresponding section 21 does not inhibit the deformation of the overhanging section 23 and effectively works to eliminate backlash by serving as an appropriate resistance.

According to the above embodiments, examples in which the plastic gear 1 is formed by injection-molding using resin material are explained. However, the plastic gear 1 can be formed by compression molding or extrusion instead of the injection-molding. Furthermore, the plastic gear 1 can be formed using rubber material instead of resin material.

INDUSTRIAL APPLICABILITY

The gear of the invention can absorb the backlash and suppress the occurrence of the teeth-knocking noises by the overhanging section coming into contact with the tooth flank of the meshing partner gear. Therefore, the gear can be widely applied to power transmission mechanisms requiring high-precision rotation transmission, and quiet and smooth rotation transmission. In particular, the gear of the invention is effective when used in an intermittent rotation transmission mechanism that frequently repeats rotation-start and rotation-stop. The gear can be widely applied to image forming devices, such as ink-jet printers, precision electrical devices, automobiles, gear trains in precision machinery and the line, and power transmission devices.

What is claimed is:

1. A gear comprising:
   a thin-walled section formed on at least one of two end faces of the gear, the end faces being located on opposite sides of a tooth, the thin-walled section being formed in a tooth-width direction and project outwards in the tooth-width direction,
   wherein, the thin-walled section includes:
      an overhanging section formed along one tooth flank side of two tooth flanks of the tooth and formed so as to project toward a tooth flank of an adjacent tooth which is located on the one tooth flank side, said overhanging section being sloped from a base end, which is near the one end face, to a tip end, which is far from the one end face,
      a tooth crest corresponding section formed along a tooth crest of the tooth and continuous to the overhanging section,
      a tooth flank corresponding section formed along the other tooth flank of the two tooth flanks of the tooth and being continuous to the tooth crest corresponding section, and
      a bottom land corresponding section formed along a bottom land of the tooth and being formed so as to continuously connect the overhanging section and a tooth flank corresponding section formed in the tooth adjacent to the one tooth flank side; and wherein a projection amount at the tip end of the overhanging section is greatest at an intermediate section which is between the tooth crest corresponding section and the bottom land corresponding section and intersects with a pitch circle of the gear, and thicknesses of the thin-walled section satisfy the following:

$T1 < T3 < T2$, $T5 < T3$, $T6 < T3$, $T6 < T4$, and $T5 < T6$ in which

T1 is a thickness of the tooth crest corresponding section,

T2 is a thickness of the tooth flank corresponding section,

T3 is a thickness of the overhanging section,

T4 is a thickness of the bottom land corresponding section,

T5 is a thickness of a first connecting section that is a connecting section between the tooth flank corresponding section and the overhanging section, and T6 is a thickness of a second connecting section that is a connecting section between the overhanging section and the bottom land corresponding section.

2. The gear according to claim 1, wherein the overhanging section has a constant thickness in the width-direction.

3. The gear according to claim 1, wherein a thin-walled section formed on the other one of the end faces of the gear, the end faces being located on opposite sides of the tooth, the thin-walled section being formed in a tooth-width direction, and an overhanging section of the thin-walled section formed on said other one of the end faces is provided on the tooth flank side on which the overhanging section formed on said one tooth flank is provided.

4. The gear according to claim 1, wherein the gear is formed from polyacetal by injection molding, and the thickness T1, the thickness T3, and the thickness T2 satisfy the following:

$T1:T3:T2 = 3:4:6$.

* * * * *